United States Patent
Glasser

[19]

[11] Patent Number: 5,935,878
[45] Date of Patent: Aug. 10, 1999

[54] MICROMESH LAMINATE

[76] Inventor: Bruce Scott Glasser, 606 Nottingham Ct., Norwood, N.J. 07648

[21] Appl. No.: 08/889,272

[22] Filed: Jul. 8, 1997

[51] Int. Cl.[6] ........................................................ B32B 5/18
[52] U.S. Cl. .................................. 442/30; 442/1; 442/49; 442/56; 442/315; 442/312
[58] Field of Search ................................ 442/30, 49, 56, 442/38, 41, 45, 46, 47, 312, 315, 1

[56] References Cited

U.S. PATENT DOCUMENTS

| | | | |
|---|---|---|---|
| 4,051,848 | 10/1977 | Levine | 128/156 |
| 4,311,745 | 1/1982 | Civardi | 428/91 |
| 4,351,872 | 9/1982 | Brosseau et al. | 428/198 |
| 4,537,822 | 8/1985 | Nanri et al. | 428/212 |
| 4,636,424 | 1/1987 | Amemiya et al. | 428/198 |
| 4,734,306 | 3/1988 | Lassiter | 428/71 |
| 4,864,660 | 9/1989 | Sawyer | 2/161 |
| 4,871,597 | 10/1989 | Hobson | 428/36.1 |
| 5,071,697 | 12/1991 | Gulya et al. | 428/234 |
| 5,352,216 | 10/1994 | Shiono et al. | 604/312 |
| 5,406,646 | 4/1995 | Balit et al. | 2/67 |
| 5,415,924 | 5/1995 | Herlihy, Jr. | 428/284 |
| 5,431,970 | 7/1995 | Broun et al. | 428/36.5 |
| 5,445,874 | 8/1995 | Shehata | 428/252 |
| 5,514,459 | 5/1996 | Blauer et al. | 428/246 |
| 5,520,980 | 5/1996 | Morgan et al. | 428/246 |
| 5,599,610 | 2/1997 | Levy | 442/261 |
| 5,600,974 | 2/1997 | Schnegg et al. | 66/192 |
| 5,620,771 | 4/1997 | Middleton | 428/131 |
| 5,631,074 | 5/1997 | Herlihy, Jr. | 442/35 |

*Primary Examiner*—James J. Bell
*Attorney, Agent, or Firm*—David P. Gordon; David S. Jacobson; Thomas A. Gallagher

[57] ABSTRACT

A first embodiment of a micromesh laminate includes a micromesh fabric first layer, a form-providing second layer laminated to the micromesh fabric, and preferably a woven or knit fabric third layer laminated or stitched to the second layer. The micromesh fabric is typically a knit fabric made of polyester or nylon and has small holes, on the order of approximately 0.5 mm by 0.5 mm to 3 mm by 3 mm, knit into the fabric. Preferably, the second layer is either a high or low density polyurethane foam, neoprene foam, or film, and the third layer is made from cotton, nylon, polyester, acrylic, or spandex. The layers are preferably bonded together with an adhesive which can withstand high washability, e.g., a crosslinked urethane adhesive; alternatively, the second layer and third layer may be flame laminated or stitched together. A second embodiment of a micromesh laminate includes a micromesh first layer, and a woven or knit fabric second layer laminated to the first layer. In either embodiment, the second layer may be provided with a color different than that of the micromesh first layer. When the first and second layers are laminated together, the color of the second layer is visible through the knit holes of the micromesh fabric, thereby providing a two-tone fabric.

28 Claims, 3 Drawing Sheets

MICROMESH LAMINATE

BACKGROUND OF THE INVENTION

1. Field of the Invention

This invention relates broadly to fabric laminates. More particularly, this invention relates to micromesh fabric laminates usable for apparel and sports bags.

2. State of the Art

Sports apparel and sports bags are popular items with a large market. Dedication to a sport team or sports figure is often displayed by wearing garments similar to the actual garments worn by popular sports teams and sports figures, or having colors symbolizing the team or figure.

In a number of sports, e.g., football and hockey, jerseys made from a micromesh fabric are worn. Micromesh fabric is preferred, as the small mesh holes, typically on the order of 0.5 mm by 0.5 mm to 3 mm by 3 mm, are knit into the fabric to permit air permeability and breathability while still providing a "substantial" fabric. The holes are knit, rather than die cut into the fabric, as is done in less desirable perforate fabrics, as knit holes have a cleaner look and do not cut threads while die cut holes have loose cut threads around the holes and have a tendency to unravel at the holes. In addition, regular mesh fabrics with large holes are not used for jerseys for several reasons. First, they typically do not have the strength for the rough treatment subject to a fabric during sports play. Second, pieces for regular mesh fabric are more difficult to stitch together than pieces of micromesh fabrics. Third, it is difficult to apply stitched-on or iron-on emblems and numerals to regular mesh fabrics.

Because of the high quality of micromesh fabrics and because it is the same type of fabric as is used by the sports teams and sports figures, micromesh fabric is desired by consumers of "sports" apparel, sports bags, and other sports related items. However, micromesh fabrics, while of a high quality, are typically limited to apparel because they are not strong enough for providing the strength, durability, support, and form necessary for sturdy bags. Moreover, micromesh fabrics have been limited to a single color; that is, unless other colors are screened onto the fabric, the fabric of the garment, with the exception of threads stitching the fabric together, piping, etc., is of one color. As a result, while the fabric is desirable, potential designs enabling the promotion of a sports team have been quite limited.

SUMMARY OF THE INVENTION

It is therefore an object of the invention provide a fabric laminate which incorporates a micromesh fabric as an outer layer.

It is another object of the invention to provide a fabric laminate incorporating a micromesh fabric and a fabric having increased strength relative to the micromesh fabric.

It is a further object of the invention to provide a multi-color fabric laminate incorporating a micromesh fabric.

In accord with these objects which will be discussed in detail below, a fabric laminate incorporating a micromesh fabric is provided. According to a first embodiment of the invention, the "micromesh laminate" includes a micromesh fabric first layer, a form-providing second layer laminated to the micromesh fabric, and preferably a woven or knit fabric third layer laminated or stitched to the second layer. The micromesh fabric is typically a knit fabric made of polyester or nylon and has small holes, on the order of approximately 0.5 mm by 0.5 mm to 3 mm by 3 mm, knit into the fabric. Preferably, the second layer is either a high density or low density polyurethane foam or neoprene foam, and the third layer is made from cotton, nylon, polyester, acrylic, spandex, or acetate. The first and second layers are preferably bonded together with an adhesive which can withstand high washability, e.g., a crosslinked urethane adhesive, or may be flame laminated together. The second and third layers are likewise preferably bonded together with an adhesive which can withstand high washability, e.g., a crosslinked urethane adhesive, or may be flame laminated or stitched together. It will be appreciated that the identical method of bonding (e.g., flame lamination) need not be utilized in bonding the first and second layers together and the second and third layers together.

According to a second preferred embodiment, the micromesh laminate includes a micromesh first layer, and a woven or knit fabric second layer bonded to the first layer. A preferable fabric for the second layer is spandex, and the fabric laminate has particular use for bicycle shorts.

According to a third preferred embodiment, the micromesh laminate includes a micromesh first layer, a film second layer, and a lining fabric third layer. The film layer is preferably made of polyethylene film. The fabric laminate has particular use for sailing jackets.

In each embodiment, the second layer; i.e., the layer under the micromesh layer, may be provided with a color different than that of the micromesh first layer. As a result, when the two layers are provided together, the color of the second layer is visible through the knit holes of the micromesh fabric, thereby providing a two-tone fabric. As many sports teams are identified by two-colors, the micromesh laminate can be used to construct two-tone sports bags and apparel which readily identify a bag or article of clothing with a particular sports team.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
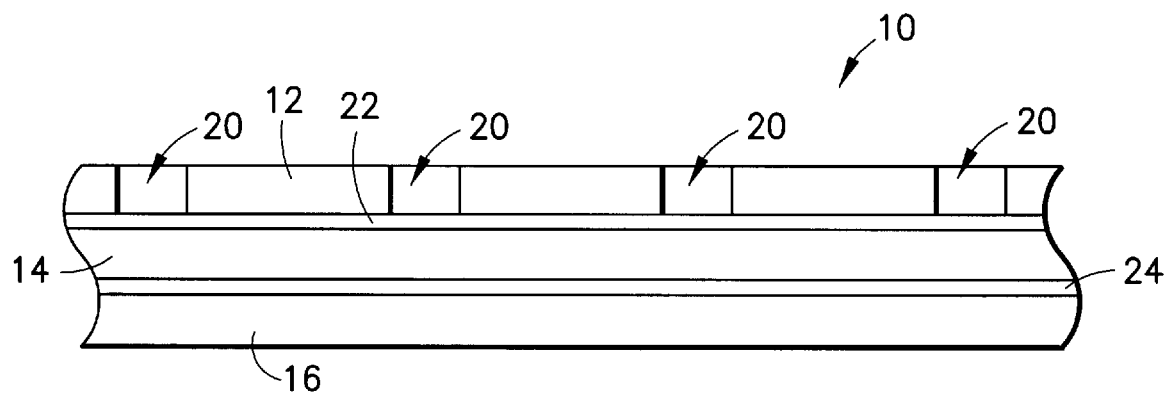
FIG. 1 is an enlarged broken side elevation of a micromesh fabric laminate according to a first embodiment of the invention.
Figure 2:
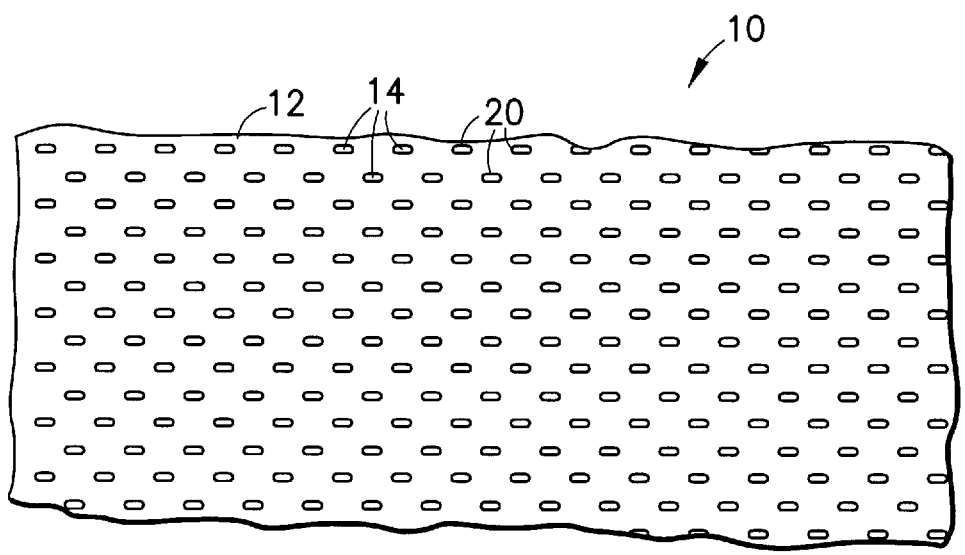
FIG. 2 is a top view of a micromesh fabric laminate according to a first embodiment of the invention.

Turning now to FIG. 1, a micromesh fabric laminate 10 according to a first preferred embodiment of the invention is shown. The micromesh fabric laminate 10 generally includes a micromesh fabric first layer 12, a foam second layer 14, and a fabric third layer 16. The micromesh fabric first layer is a colored fabric layer preferably made from polyester, nylon, or a blend including polyester or nylon, and having holes 20 knit into the fabric. Referring to FIG. 2, the holes 20 are preferably approximately 0.5 mm by 0.5 mm to 3 mm by 3 mm in size, and typically have a center to center separation between the holes of approximately 1 mm to 6 mm. Micromesh fabrics are available from, e.g., Glen Raven Mills, Inc. of Glen Raven, N.C.

The foam second layer 14 is preferably made from a high or low density polyurethane-ether, polyurethane-ester, or neoprene foam. According to a preferred embodiment of the invention of the invention, the foam second layer has a preferable thickness of between 0.001 inches and 0.5 inches, and is colored a different color than the micromesh first layer.

The fabric third layer 16 is preferably a woven, knit, or fleece fabric which may be made from polyester, cotton, wool, nylon, spandex, acetate, acrylic, terry cloth, polypropylene, brushed polyester, brushed nylon, brushed cotton, or a blend incorporating any one or more of these materials. The fabric layer may also be another layer of micromesh fabric.

According to the first preferred embodiment, the foam second layer 14 is bonded to the micromesh first layer 12 with an adhesive 22. Preferably, the adhesive 22 is breathable and has high washability; i.e, the adhesive 22 can be washed many times without breaking down and allowing the first and second layers to delaminate from each other, and is applied by rotogravure printing or other techniques which provided interstitial spaces in the adhesive. A preferred adhesive is a crosslinked polyurethane adhesive, for example, the adhesive made by the process disclosed in U.S. Pat. No. 4,761,324 to Rautenberg, which is hereby incorporated herein in its entirety. Alternatively, rather than utilizing an adhesive, the foam second layer 14 may be flame laminated to the micromesh first layer 12 as disclosed in co-owned U.S. application Ser. No. 08/883,294, filed on Jun. 27, 1997, entitled "Three Layer Flame Laminated Fabric", which is hereby incorporated by reference herein in its entirety. The fabric third layer 16 is also preferably bonded to the foam second layer with an adhesive 24 having high washability, or via flame lamination. Alternatively, the fabric third layer may be stitched rather than bonded to the foam second layer.

Figure 3:
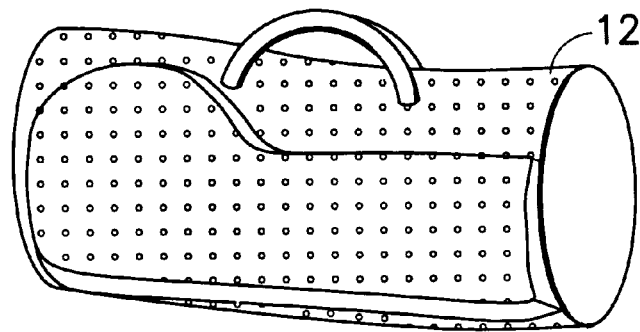
FIG. 3 is a sports bag made from a micromesh fabric laminate according to the invention.
Figure 4:
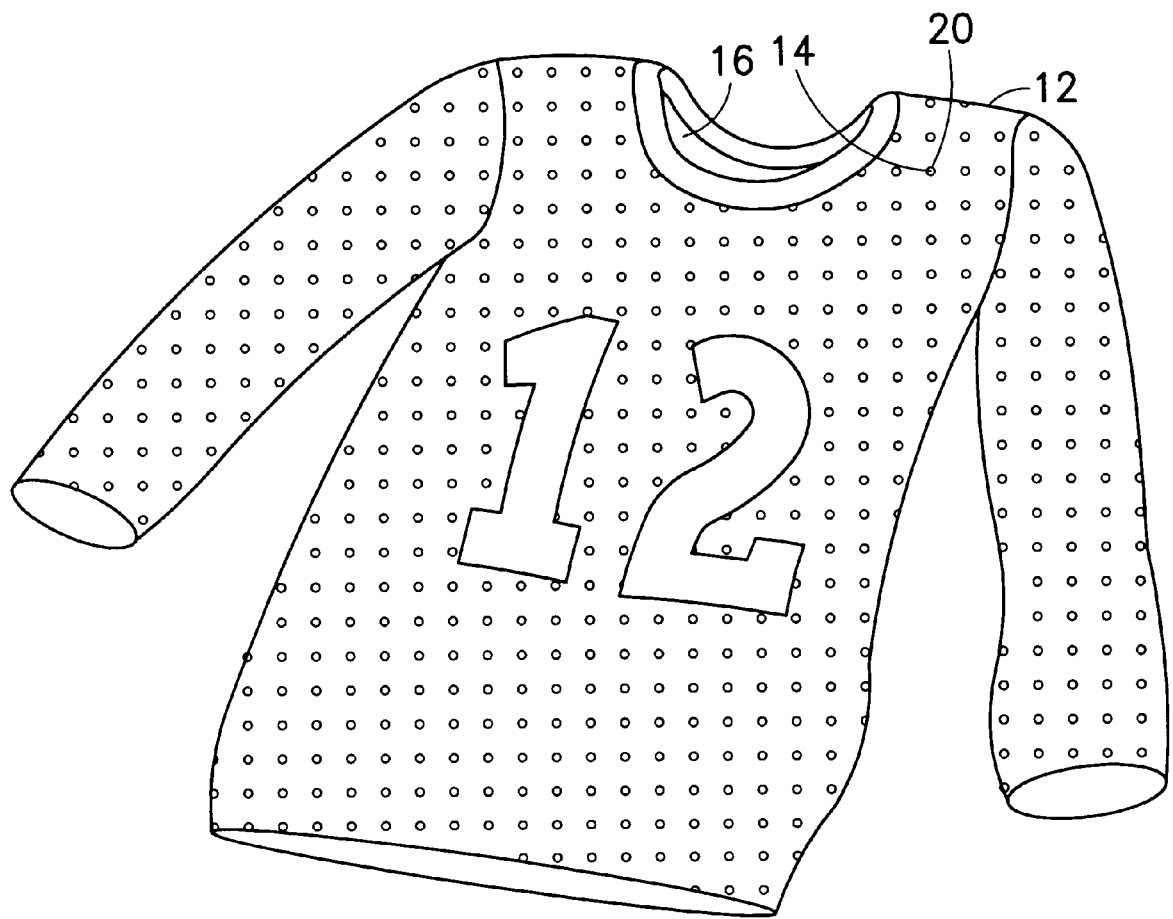
FIG. 4 is an article of clothing made from a micromesh fabric according to the invention.

By laminating the micromesh first layer, the foam second layer, and the fabric third layer, a strong and durable fabric able to be constructed into a free standing bag 30 (FIG. 3), an article of clothing, including shirts 32 (FIG. 4), shorts, and hats, and other sports and non-sports related items. Furthermore, when laminating a micromesh first layer 12 to a colored foam second layer 14 having a color which is different than the first layer, a two-tone fabric having a micromesh outer layer 12 results, with the color of the foam second layer 14 being visible through the micromesh holes 20 (FIG. 2). As such, a visually striking material is created using materials desired by consumers of products for which the micromesh laminate of the invention is intended. As many sports teams are identified by two colors, the micromesh laminate can be used to construct two-tone sports bags and apparel which readily identify a bag or article of clothing with a particular sports team.

Figure 5:
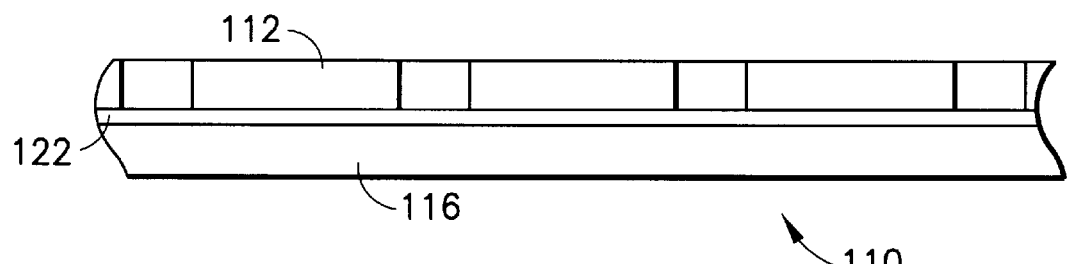
FIG. 5 is a micromesh fabric laminate according to a second embodiment of the invention.

Turning now to FIG. 5, a second preferred embodiment of a micromesh laminate 110 is provided. The laminate includes a micromesh first layer 112 as described above, and a fabric second layer 116. The fabric second layer 116 of the present embodiment (FIG. 5) may comprise the same materials as disclosed above with respect to the fabric third layer 16 of the first embodiment (FIG. 1), but is preferably made of spandex. The micromesh first layer 112 and fabric second layer 116 are laminated preferably using an adhesive 122 having high washability, and preferably according to techniques which permit breathability. As with the first embodiment, the first and second layers 112, 116 may be provided with different, and especially contrasting colors to result in a visual appealing fabric useful in apparel (particularly bicycle shorts) and sports bags.

Figure 6:
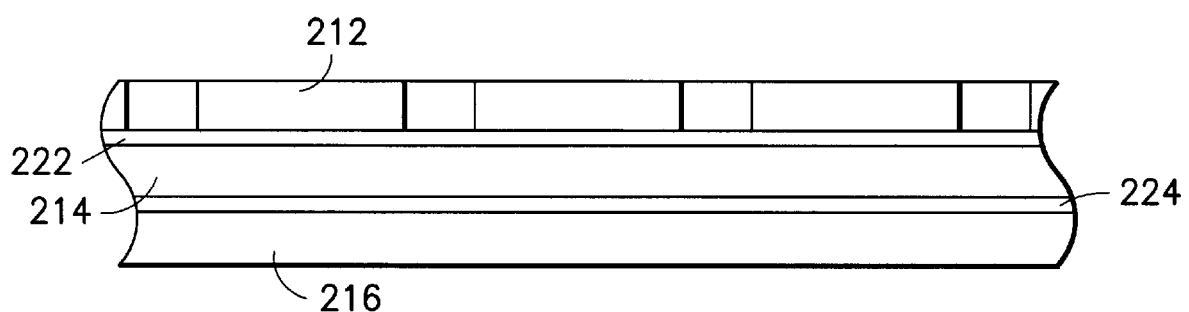
FIG. 6 is a micromesh fabric laminate according to a third embodiment of the invention.

Referring now to FIG. 6, a third preferred embodiment of a micromesh laminate 210 is provided. The laminate includes a micromesh first layer 212 as described above, a film second layer 214, and a lining fabric third layer 216. The film second layer is preferably a waterproof polyurethane film, e.g., TX1540™ film from Shawmut Mills of West Bridgewater, Mass.; however, other waterproof films, e.g., polyethylene film, polyvinylchloride film, or resins, may also be used. The fabric third layer 216 of the present embodiment may comprise the same materials as disclosed above with respect to the fabric third layer 16 of the first embodiment (FIG. 1). The micromesh first layer 212 is laminated, preferably by an adhesive 222, to the film second layer 214, and the film second layer is laminated, preferably by an adhesive 224, to the lining fabric third layer 216. Alternatively, one or both of the first and third layers may be laminated to the second layer by flame laminating. The first and second layers 212, 214 may be provided with different, and especially contrasting colors to result in a visual appealing fabric useful in apparel (particularly sailing jackets) and sports bags.

Figure 7:
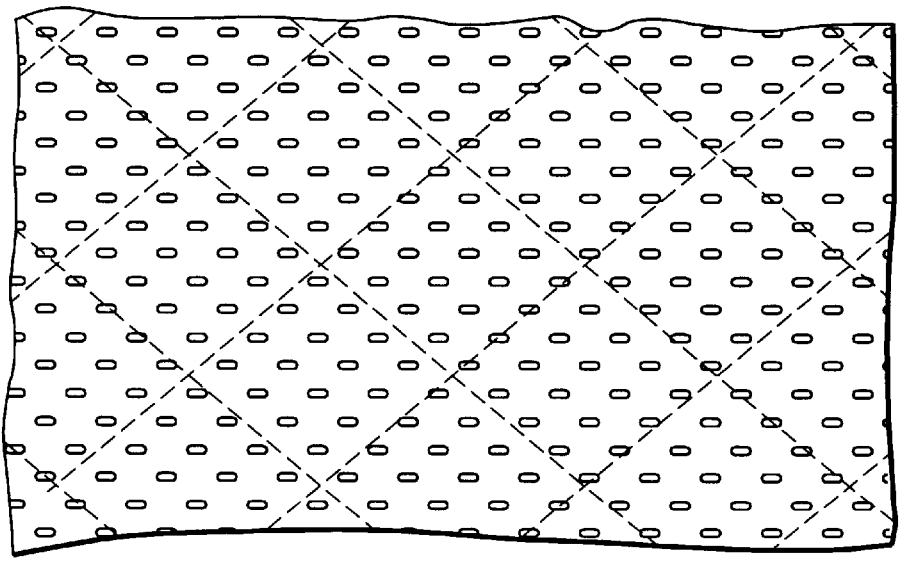
FIG. 7 is a broken top view of a quilted micromesh fabric laminate according to the invention.

While in each embodiment of the invention it is preferred to laminate the layers together with an adhesive or by flame laminating the layers, as seen in FIG. 7, quilting may also be used to "laminate" the layers. The stitches 310 of quilting, which provide numerous, repeated small enclosed sections, provide a laminate-like effect in which the various fabric layers are maintained in contact with each other over substantially their entire surface area. This is in contrast to simple sewing in which the fabric layers are joined at their edges and draped together, and which fails to result in the consistent two-tone color contrasting effect provided in the laminate fabrics described above.

There have been described and illustrated herein embodiments of a micromesh laminate fabric. While particular embodiments of the invention have been described, it is not intended that the invention be limited thereto, as it is intended that the invention be as broad in scope as the art will allow and that the specification be read likewise. Thus, while the micromesh fabric layer has been described with respect to particular preferred knit hole sizes, and relative distances apart between the holes, other micromesh fabrics having holes of different sizes, e.g., up to 6 mm in diameter, and greater separation, e.g., by up to 10 mm, may also be used. In addition, while die cut perforated fabrics are not as desirable as micromesh fabrics for the first layer, it will be understood that die cut perforated fabrics may alternatively be used rather than micromesh fabrics. Also, while, with respect to the first embodiment, polyurethane-ether, polyurethane-esters, and neoprene foams have been disclosed, it will be appreciated that other foams, webs, and fibers, e.g., fiber fill, may be used as well. Furthermore, while the adhesive preferably has high washability and is applied so that the laminate has breathability, these properties are not required of the adhesive, and while particular adhesives have been disclosed, other adhesives could be utilized. Likewise, while flame lamination has been disclosed as a bonding method which does not utilize adhesives, other lamination techniques can be utilized. In addition, while the micromesh laminate has been disclosed to have particular use in shirts, shorts, hats, and bags, it will be understood that the micromesh fabric may have other utility, e.g., flags, shoes, bathing suits, gloves, etc. It will therefore be appreciated by those skilled in the art that yet other modifications could be made to the provided invention without deviating from its spirit and scope as so claimed.

What is claimed is:

1. A micromesh laminate, comprising:
   a) a micromesh first layer having a surface provided with a plurality of knit holes, said surface having a surface area and said knit holes having a combined area which is substantially less than one-half said surface area; and
   b) a second layer directly bonded to said micromesh layer over substantially their entire surface areas.

2. A micromesh laminate according to claim 1, wherein:
   said micromesh fabric is made of at least one of polyester, nylon, a polyester blend, and a nylon blend.

3. A micromesh laminate according to claim 1, wherein:
   said micromesh fabric is provided with knit holes, said knit holes having a first dimension between approximately 0.5 mm to approximately 3 mm.

4. A micromesh laminate according to claim 1, wherein:
   said second layer is a foam.

5. A micromesh laminate according to claim 4, wherein:
   said foam comprises one of polyurethane-ether, polyurethane-ester, and neoprene.

6. A micromesh laminate according to claim 1, wherein:
   said second layer is one of knit fabric and a woven fabric.

7. A micromesh laminate according to claim 6, wherein:
   said one of said knit fabric and said woven fabric comprises at least one of polyester, cotton, nylon, spandex, wool, acetate, acrylic, terry cloth, polypropylene, brushed polyester, brushed nylon, and brushed cotton.

8. A micromesh laminate according to clam 6, wherein:
   said second layer is micromesh knit fabric.

9. A micromesh laminate according to claim 1, wherein:
   said second layer is bonded to said micromesh layer with a crosslinked polyurethane adhesive.

10. A micromesh laminate according to claim 1, further comprising:
    c) a third layer attached to said second layer.

11. A micromesh laminate according to claim 10, wherein:
    said second layer is a film layer and said third layer is one of a woven fabric, a knit fabric, and a fleece fabric.

12. A micromesh laminate according to claim 11, wherein:
    said film layer comprises one of polyurethane, polyvinylchloride, and polypropylene.

13. A micromesh laminate according to claim 1, wherein:
    said first layer is of a first color and said second layer is of a second color different than said first color, said second color being visible through said plurality of holes provided in said first layer.

14. A fabric laminate, comprising:
    a) a first fabric layer having a surface provided with a plurality of holes which are one of die cut or knit in said first fabric layer, said surface having a surface area and said holes having a combined area which is substantially less than one-half said surface area;
    b) a foam second layer directly bonded to said first fabric layer over substantially their entire surface areas; and
    c) a fabric third layer which is one of bonded or otherwise attached to said second layer.

15. A fabric laminate according to claim 14, wherein:
    said foam comprises one of polyurethane-ether, polyurethane-ester, and neoprene.

16. A fabric laminate according to claim 14, wherein:
    said second layer is bonded to said first layer with a crosslinked polyurethane adhesive.

17. A micromesh fabric according to claim 4, further comprising:
    c) a fabric layer which is one of bonded, sewn, and quilted to said foam layer.

18. A micromesh fabric according to claim 17 wherein:
    said micromesh layer comprises one of nylon and polyester and is provided with knit holes having a first dimension of between approximately 0.5 mm to approximately 3 mm.

19. A micromesh laminate fabric, comprising:
    a) a micromesh layer having a surface provided with a plurality of knit holes, said surface having a surface area and said knit holes having a combined area which is substantially less than one-half said surface area; and
    b) a second layer which is one of directly bonded and quilted to said micromesh layer over substantially their entire surface areas.

20. A micromesh fabric according to claim 19, wherein:
    said second layer comprises one of a polyurethane-ether foam, a polyurethane-ester foam, a neoprene foam, a polyurethane film, a polyvinylchloride film, and a polypropylene film.

21. A micromesh fabric according to claim 20, further comprising:
    c) a third layer which is one of bonded, quilted, and sewn to said second layer.

22. A micromesh fabric according to claim 21, wherein:
    said third layer comprises one of a knit fabric, a woven fabric, and a fleece fabric.

23. A micromesh fabric according to claim 19, wherein:
    said second layer comprises one of a knit fabric, a woven fabric, and a fleece fabric.

24. A micromesh laminate according to claim 1, wherein:
    said combined area of said knit holes is less than twenty-five percent of said surface area.

25. A micromesh laminate according to claim 8, wherein:
    said micromesh first layer is of a first color and said micromesh knit fabric second layer is of a second color different than said first color, said second color being visible through said plurality of holes provided in said first layer.

26. A fabric laminate according to claim 14, wherein:
    said combined area being less than twenty-five percent of said surface area.

27. A micromesh fabric according to claim 18, wherein:
    said combined area being less than twenty-five percent of said surface area.

28. A micromesh fabric according to claim 19, wherein:
    said combined area being less than twenty-five percent of said surface area.

* * * * *